(12) United States Patent
Sung

(10) Patent No.: US 11,734,215 B2
(45) Date of Patent: Aug. 22, 2023

(54) SIGNAL PROCESSING SYSTEM AND METHOD FOR IDENTIFYING AND PAIRING A SIGNAL TRANSMITTING DEVICE

(71) Applicant: Realtek Semiconductor Corp., HsinChu (TW)

(72) Inventor: Lien-Hsiang Sung, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/531,807

(22) Filed: Nov. 22, 2021

(65) Prior Publication Data

US 2022/0309018 A1 Sep. 29, 2022

(30) Foreign Application Priority Data

Mar. 26, 2021 (TW) .................................. 110111120

(51) Int. Cl.
| | | |
|---|---|---|
| *G06F 13/40* | (2006.01) | |
| *G06F 13/38* | (2006.01) | |
| *G06F 21/73* | (2013.01) | |
| *G06F 21/62* | (2013.01) | |

(52) U.S. Cl.
CPC ........ *G06F 13/4027* (2013.01); *G06F 13/385* (2013.01); *G06F 21/62* (2013.01); *G06F 21/73* (2013.01)

(58) Field of Classification Search
None
See application file for complete search history.

(56) References Cited

U.S. PATENT DOCUMENTS

| | | | | |
|---|---|---|---|---|
| 5,649,001 | A * | 7/1997 | Thomas | H04L 9/40 379/93.07 |
| 6,370,603 | B1 * | 4/2002 | Silverman | G06F 13/385 710/63 |
| 6,978,319 | B1 * | 12/2005 | Rostoker | G06F 9/4411 710/72 |
| 10,346,336 | B2 * | 7/2019 | Tominaga | G06F 1/266 |
| 2003/0167391 | A1 * | 9/2003 | Al-Ali | A61B 5/6838 713/153 |
| 2005/0261026 | A1 * | 11/2005 | Hausman | G05B 19/054 455/559 |
| 2018/0115130 | A1 * | 4/2018 | Truluck | H01R 13/6691 |
| 2022/0102028 | A1 * | 3/2022 | Horvath | G06F 1/266 |

* cited by examiner

*Primary Examiner* — Henry Tsai
*Assistant Examiner* — Aurangzeb Hassan
(74) *Attorney, Agent, or Firm* — Winston Hsu

(57) ABSTRACT

A method for identifying and pairing a signal transmitting device, including: obtaining a setting value of a master identification key; obtaining a setting value of a slave identification key; determining whether at least one of the setting values equals to an initial value; determining whether the setting value of the master identification key equals to the setting value of the slave identification key when none of the setting values equals to the initial value; and controlling the signal processing device to operate in a limited mode when the setting value of the master identification key and the setting value of the slave identification key are not equal. In the limited mode, a signal processing device does not output any signal to the signal transmitting device or ignores any signal received from a signal transmitting device, or the signal processing device only outputs a limited signal to the signal transmitting device.

14 Claims, 2 Drawing Sheets

SIGNAL PROCESSING SYSTEM AND METHOD FOR IDENTIFYING AND PAIRING A SIGNAL TRANSMITTING DEVICE

BACKGROUND OF THE INVENTION

1. Field of the Invention

The invention relates to a method for identifying and pairing a signal transmitting device and a signal processing system implementing the method.

2. Description of the Prior Art

A cable or a transmission line is a commonly used signal transmitting devices, which is coupled between two electronic devices to transmit electronic signals. In order to make existing electronic devices more distinctive, current electronic device developers not only focus on the functions and performance of electronic device itself, but also make corresponding adjustments to the cables or transmission lines, so that the performance of the final product can be more prominent and get the favor of consumers.

With such special design, the identification and pairing between the electronic device and the cable/transmission line has become an important operation. Especially, in order to prevent the electronic devices and cables/transmission lines from being maliciously copied by unauthorized vendors in the market, while maintaining the convenience in manufacturing, maintaining and inventory managing of the products, a method that can effectively identify and pair the signal transmitting devices and a signal processing system implementing the method are required.

SUMMARY OF THE INVENTION

It is an objective of the invention to effectively identifying and pairing a signal transmitting device to prevent the electronic devices and the signal transmitting device from being maliciously copied by unauthorized vendors in the market, while maintaining the convenience in manufacturing, maintaining and inventory managing of the products.

According to an embodiment of the invention, a signal processing system comprises a signal processing device and a signal transmitting device. The signal processing device comprises a processor and a memory device configured to store a master identification key. The signal transmitting device is coupled to the signal processing device and comprises a memory device configured to store a slave identification key. In a device identifying and pairing process, the processor reads the memory device of the signal processing device to obtain a setting value of the master identification key and reads the memory device of the signal transmitting device to obtain a setting value of the slave identification key, and the processor determines whether the setting value of the master identification key and the setting value of the slave identification key are equal to an initial value or whether the setting value of the master identification key is identical to the setting value of the slave identification key. When the processor determines that the setting value of the master identification key is not identical to the setting value of the slave identification key and both the setting value of the master identification key and the setting value of the slave identification key are not equal to the initial value, the processor controls the signal processing device to operate in a limited mode. In the limited mode, the signal processing device does not output any signal to the signal transmitting device or ignores any signal received from the signal transmitting device, or the signal processing device only outputs a limited signal to the signal transmitting device.

According to another embodiment of the invention, a method for identifying and pairing a signal transmitting device comprises: reading a memory device of a signal processing device in a signal processing system to obtain a setting value of a master identification key; reading a memory device of the signal transmitting device in the signal processing system to obtain a setting value of a slave identification key; determining whether at least one of the setting values of the master identification key and the slave identification key is equal to an initial value; determining whether the setting value of the master identification key is identical to the setting value of the slave identification key when none of the setting values equals to the initial value; and controlling the signal processing device to operate in a limited mode when the setting value of the master identification key is not identical to the setting value of the slave identification key. In the limited mode, the signal processing device does not output any signal to the signal transmitting device or ignores any signal received from the signal transmitting device, or the signal processing device only outputs a limited signal to the signal transmitting device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
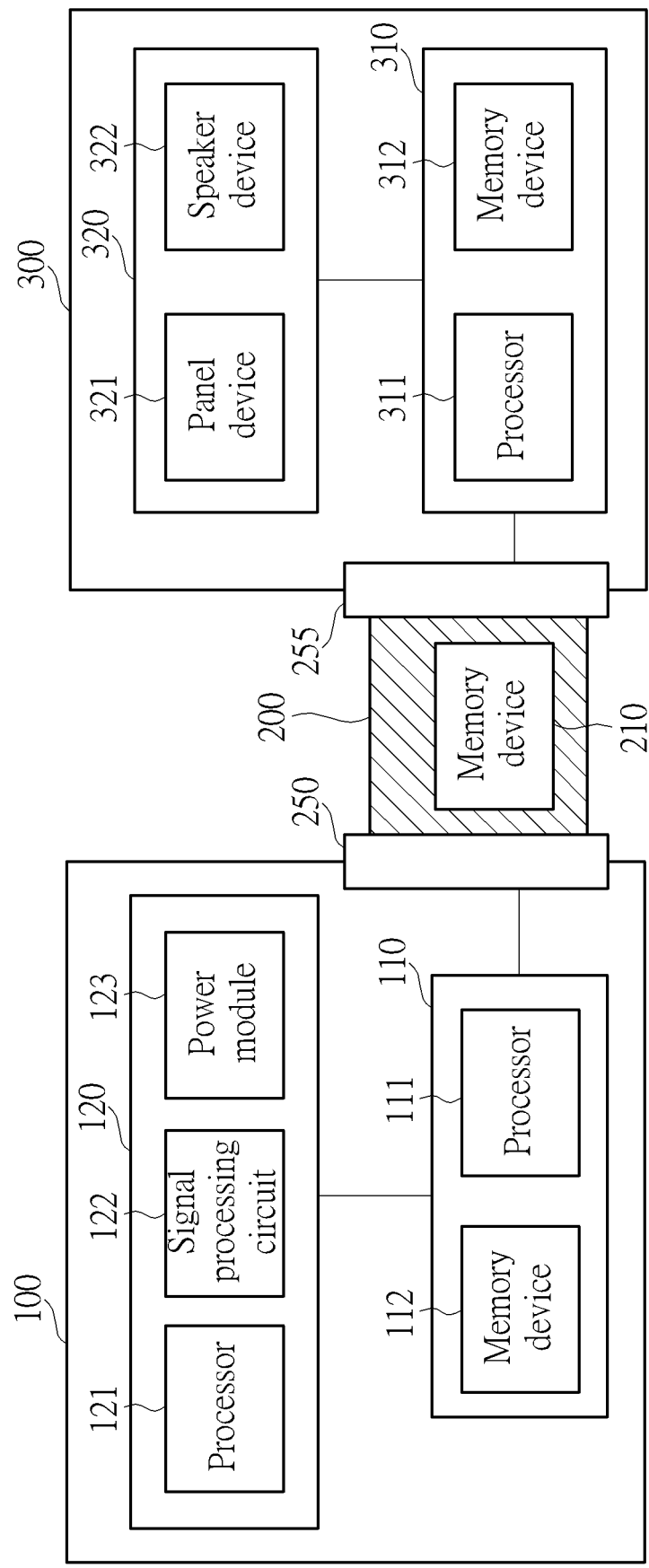
FIG. 1 shows a block diagram of a signal processing system according to an embodiment of the invention.

FIG. 1 shows a block diagram of a signal processing system according to an embodiment of the invention. The signal processing system may comprise a host device 100, a signal transmitting device 200, and a display device 300. In an embodiment of the invention, the host device 100 may be used as a signal source and configured to output at least one signal (e.g., a power signal, a control signal, a video signal, an image signal, an audio signal, etc.), and the display device 300 may receive the signal provided by the host device 100 through the signal transmitting device 200. According to an embodiment of the invention, the host device 100 may be, for example, but not limited to, the host device of a separated TV, a mobile device such as a mobile phone or a tablet, a computing device such as a laptop or a desktop computer, a set-top box (STB), a compact disc (CD)/Digital Versatile Disc (DVD) player or other electronic products. The display device 300 may be, for example, but not limited to, a display panel of the separate TV, a screen, or an electronic product such as a digital TV.

The signal transmitting device 200 may be a pluggable or removable physical device coupled between the host device 100 and the display device 300 and utilized for transmitting power signal, control signal, current signal, voltage signal, video signal, audio signal, or any communication signal generated in compliance with any communication protocol, between the host device 100 and the display device 300. In an embodiment of the invention, the signal transmitting device 200 may be a cable, and the cable may be the cable implemented in compliance with any known specifications, such as, but not limited to, the High Definition Multimedia Interface (HDMI) specifications, the Universal Serial Bus (USB) specifications, etc., or may be the cable implemented in compliance with other special specifications (e.g., a dedicated product specification defined by a product manufacturer or a modified product specification modified based on existing specification).

It is to be noted that FIG. 1 is a simplified block diagram of the signal processing system, in which the signal transmitting device 200 is represented by a line. However, the proposed signal transmitting device 200 of the invention is not limited to the shape as shown in FIG. 1. For example, the signal transmitting device 200 may actually comprise one or more of the plugs or connectors, such as the connector 250 and the connector 255, used to connect the host device 100 and the display device 300, and a transmission line used to transmit signals. In addition, it is to be noted that FIG. 1 is drawn by way of example, in which the elements are not necessarily drawn to scale.

According to an embodiment of the invention, the host device 100 may at least comprise a signal processing device 110 and a chip device 120, such as an SoC (System on a Chip). The signal processing device 110 may be, as an example but not limited to, a bridge device configured to perform signal conversion on one or more signals received from or provided to the signal transmitting device 200. The chip device 120 may be, as an example but not limited to, the host chip of a separate TV, as a signal source of the signal processing system. As an example, the chip device 120 may obtain the power signal and/or the signal to be displayed by the display device 300 in a wired or wireless manner, and, after some proper signal processing, provide the received signal to the signal processing device 110 in compliance with an internal communication protocol (as an example but not limited to, the V-by-One communication protocol, the eDP (Embedded Display Port) or EPI (Embedded Panel Interface) communication protocol). The signal processing device 110 may perform signal conversion, comprising communication protocol conversion, on the received signal and provided the processed signal to the signal transmitting device 200, for the signal to be transmitted to the display device 300 through the signal transmitting device 200 in compliance with an external communication protocol (as an example but not limited to, the standard or modified HDMI or USB protocol). It is to be noted that the signal transmissions through the chip device 120, the signal processing device 110 and the signal transmitting device 200 may be bidirectional. Therefore, the signal processing device 110 may also perform reverse signal and communication protocol conversion on the signal received from the signal transmitting device 200 based on the similar logic.

According to an embodiment of the invention, the aforementioned internal communication protocol and external communication protocol of the host device 100 may be different communication protocols. For example, the internal communication protocol may be designed as the protocol suitable for relative short distance and relative slow speed transmission, while the external communication protocol may be designed as the protocol suitable for relative long distance and relative high speed transmission. To be more specific, in the embodiments of the invention, the overall transmission bandwidth achieved in compliance with the external communication protocol may be greater than or equal to the overall transmission bandwidth achieved in compliance with the internal communication protocol. Therefore, in an embodiment of the invention, the number of channels or lines configured outside of the host device 100 and operate in compliance with the external communication protocol may be less than the number of channels or lines configured inside of the host device 100 and operate in compliance with the internal communication protocol. In this manner, the size of the signal transmitting device 200 can be effectively reduced, and the effect of beauty/simplicity of the signal transmitting device 200 is achieved.

The signal processing device 110 may comprise a processor 111 and a memory device 112. The processor 111 may be configured to control operations of the signal processing device 110, and the memory device 112 may be configured to store data required for the operations of the signal processing device 110. The chip device 120 may comprise a processor 121, a signal processing circuit 122 and a power module 123. The processor 121 is configured to control operations of the chip device 120. The signal processing circuit 122 is configured to process the received signals, for example, performing a variety of image or audio signal optimization processes. The power module 123 is configured to control the overall power system of the host device 100, which may further comprise the devices for power control, power monitoring and/or power output. It is to be noted that in some embodiments, the processor 111 and/or 121 may be implemented by a general-purpose processor or a micro-processor, and the processor 121 and the signal processing circuit 122 may be integrated as a signal single processor device.

The display device 300 may at least comprise a signal processing device 310 and a display panel 320. The signal processing device 310 may be, as an example but not limited to, a bridge device configured to perform signal conversion, comprising the communication protocol conversion, on one or more signals received from or provided to the signal transmitting device 200. For example, the signal processing device 310 may receive signals from the signal transmitting device 200 in compliance with the aforementioned external communication protocol and perform signal conversion, comprising communication protocol conversion, on the received signals, for the signal to be transmitted to the display panel 320 in compliance with the internal communication protocol. Similarly, the signal transmissions through the signal transmitting device 200, the signal processing device 310 and the display panel 320 may be bidirectional. Therefore, the signal processing device 310 may also perform reverse signal and communication protocol conversion on the signals received from the display panel 320 based on the similar logic. According to an embodiment of the invention, the aforementioned internal communication protocol and external communication protocol of the display device 300 may be different communication protocols. As an example, similarly, the internal communication protocol of the display device 300 may be designed as the protocol suitable for relative short distance and relative slow speed transmission, while the external communication protocol may be designed as the protocol suitable for relative long distance and relative high speed transmission. Regarding the illustrations of the internal communication protocol and external communication protocol of the display device 300, reference may be made to the corresponding paragraphs as discussed above for the host device 100, and will not be described herein for brevity.

The signal processing device 310 may comprise the processor 311 and the memory device 312. The processor 311 may be configured to control operations of the signal processing device 310, and the memory device 312 may be configured to store data required for the operations of the signal processing device 310. The display panel 320 may comprise a panel device 321 and/or a speaker device 322. It is to be noted that FIG. 1 shows only the elements related to the invention. Those skilled in this art will understand that the signal processing system, the host device 100 and display device 300 may further comprise other components not shown in FIG. 1, so as to implement the required signal processing functions.

According to an embodiment of the invention, besides the components such as connectors or plugs and transmission lines for transmitting signals, the signal transmitting device 200 may further comprise a memory device 210. It is to be noted that the invention is not limited to dispose the memory device 210 at any one of the transmission line or the connector or plug end of the signal transmitting device 200. As described above, in order to prevent the electronic devices and signal transmitting device from being maliciously copied by unauthorized vendors in the market, while maintaining the convenience in manufacturing, maintaining and inventory managing of the products, a method for effectively identifying and pairing a signal transmitting device and a signal processing system implementing the method have been proposed. In the proposed method, the memory device of at least one of the host device 100 and the display device 300, e.g., the memory device 112 and/or 312, may store an identification key, and the memory device 210 of the signal transmitting device 200 may also store an identification key.

By determining the current setting value of each identification key, the host device 100 and/or the display device 300 is able to effectively identify and pair the signal transmitting device 200. For discrimination, in the following paragraphs, the identification keys stored in the memory devices of the host device 100 and the display device 300 will be collectively named as the "master identification key", and the identification key stored in the memory device of the signal transmitting device 200 will be named as "slave identification key". In addition, since the proposed method for identifying and pairing a signal transmitting device may be implemented in either the host device 100 or the display device 300, in order to keep the disclosure concise, the "signal processing device" in the following paragraphs will be utilized to represent the signal processing device 110 and/or the signal processing device 310 shown in FIG. 1, and the operation of the "signal processing device" is not limited to any one of the signal processing device 110 and the signal processing device 310.

According to an embodiment of the invention, the signal processing device may initiate a device identifying and pairing process when detecting that the signal transmitting device 200 is connected thereto. The signal processing device may detect whether there is any signal transmitting device connected thereto by using any method, such as actively transmitting polling signals, passively detecting whether a hardware insertion notification signal is received, or by trying to perform an access operation on the memory device of the signal transmitting device, or perform any detection operation for detecting whether there is any signal transmitting device connected to it.

In the device identifying and pairing process, the processor, e.g. the processor 111 or the processor 311, of the signal processing device may read the corresponding memory device to obtain a setting value of the master identification key and read the memory device 210 of the signal transmitting device 200 to obtain a setting value of the slave identification key. The processor may further determine whether the setting value of the master identification key and the setting value of the slave identification key are equal to an initial value. According to an embodiment of the invention, the initial value may be a specific value or may have a specific pattern, for the processor to discriminate from the other possible values. In the embodiments of the invention, besides the current setting value of the master identification key, the memory device of the signal processing device may also store the initial value as an identification and paring basis for the subsequent device identifying and pairing process.

In the embodiments of the invention, the processor may determine whether the signal transmitting device 200 is a signal transmitting device allowed to be used in the signal processing system (which may be understood as determining whether the signal transmitting device is legal in the signal processing system) according to the current setting values of the master identification key and the slave identification key. If the determination result shows yes, the processor may control the signal processing device to operate in a normal mode. If the determination result shows no, the processor may control the signal processing device to operate in a limited mode.

According to an embodiment of the invention, the processor may determine whether the setting value of the master identification key and the setting value of the slave identification key are equal to an initial value or determine whether the setting value of the master identification key is identical to the setting value of the slave identification key. When the processor determines that the setting value of the master identification key is not identical to the setting value of the slave identification key and both the setting value of the master identification key and the setting value of the slave identification key are not equal to the initial value, it means that the signal transmitting device 200 is not a signal transmitting device allowed to be used in the signal processing system (which may be understood as the signal transmitting device is illegal in the signal processing system). At this time, the processor may control the signal processing device to operate in the limited mode. In the limited mode, the signal processing device does not output any signal (e.g., the power signal, the voltage signal, the video signal, the audio signal, and so on) to the signal transmitting device, or ignores any signal received from the signal transmitting device. That is, under the limited mode, the signal processing device does not perform the original operations of communication protocol conversion and signal conversion that are supposed to be performed. Or, the signal processing device only outputs a limited signal to the signal transmitting device in the limited mode. That is, under the limited mode, the signal processing device performs the original operations of communication protocol conversion and signal conversion that are supposed to be performed only on some limited signal.

For example, the limited signal may be a low-resolution image signal or may be a signal for conveying a warning message. In the limited mode, the signal processing device may only transmit the low-resolution image signal or the warning message to another terminal of the signal transmitting device, so that the signal processing system may display the warning message or the limited low-resolution image via the display device to notify the user that this signal transmitting device is a product not allowed to be used in this signal processing system.

Figure 2:
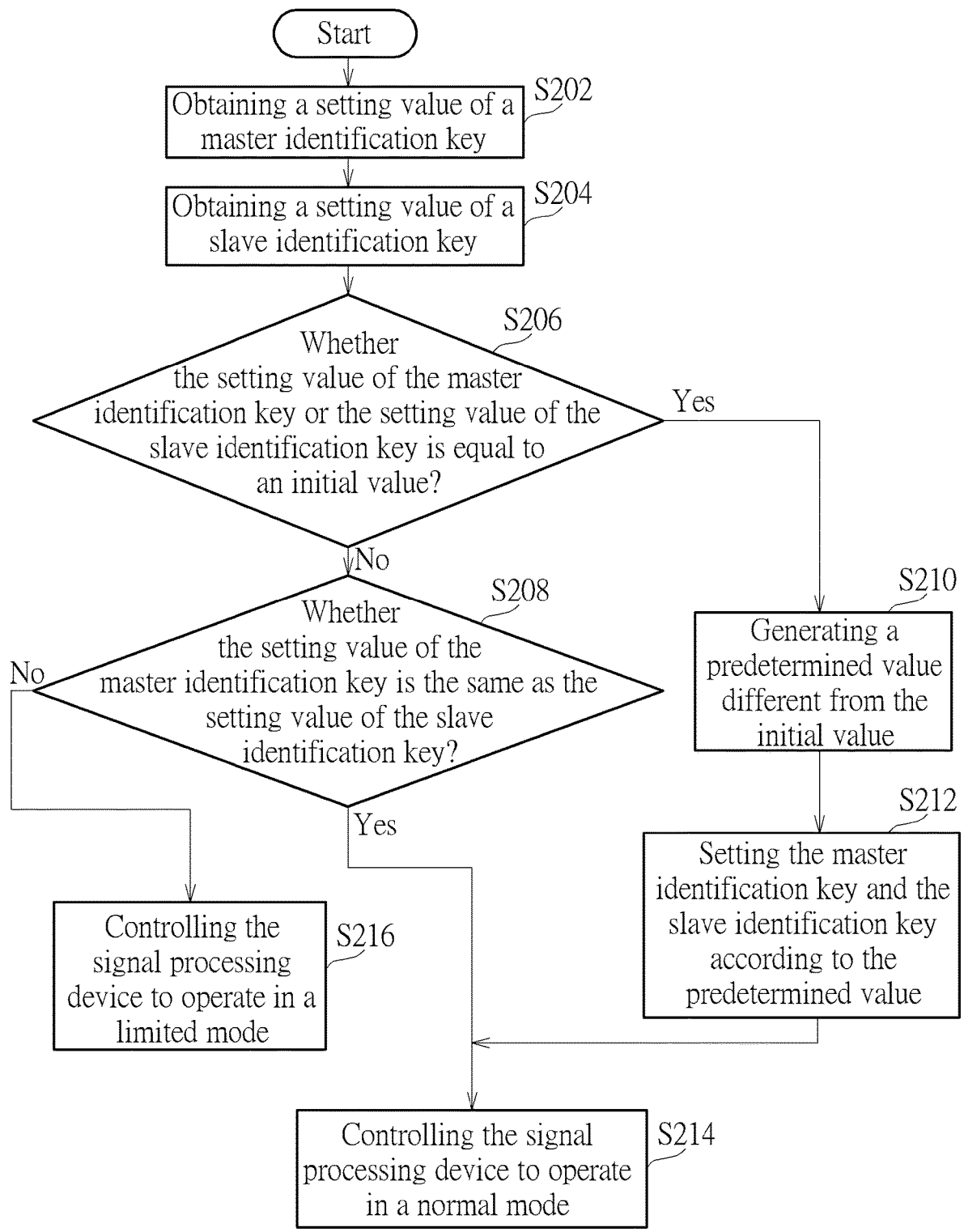
FIG. 2 is an exemplary flow chart of a method for identifying and pairing a signal transmitting device according to an embodiment of the invention.

FIG. 2 is an exemplary flow chart of a method for identifying and pairing a signal transmitting device according to an embodiment of the invention. The proposed method for identifying and pairing a signal transmitting device may comprise the following steps:

Step S202: a memory device of a signal processing device in the signal processing system is read in order to obtain a setting value of a master identification key. As discussed above, the signal processing device may be either the signal processing device 110 or the signal processing device 310.

Step S204: a memory device of a signal transmitting device in the signal processing system is read in order to obtain a setting value of a slave identification key. It is to be noted that the execution order of step S202 and S204 is not a limit, and step S202 and step S204 may also be combined as one step.

Step S206: whether at least one of the setting values of the master identification key and the slave identification key is equal to an initial value is determined. If the determination result shows no, it means that both are not equal to the initial value and step S208 is performed. If the determination result shows yes, step S210 is performed.

Step S208: whether the setting value of the master identification key matches the setting value of the slave identification key is determined. That is, determining whether the setting value of the master identification key and the setting value of the slave identification key are both equal to a value different from the initial value. If the determination result shows yes, step S214 is performed. If the determination result shows no, step S216 is performed.

Step S210: a predetermined value different from the initial value is generated by the processor of the signal processing device. In the embodiment of the invention, the processor may randomly generate a value as the predetermined value, or may generate the predetermined value according to a specific method (e.g., random or pseudo-random method) for generating a value, wherein the value generated by the specific method is difficult to predict.

Step S212: the master identification key and the slave identification key is set according to the predetermined value, for both the setting value of the master identification key and the setting value of the slave identification key being equal to the predetermined value. In this step, the processor of the signal processing device may store the predetermined value in the respective memory device, so as to respectively update the setting value of the master identification key and the setting value of the slave identification key. It is to be noted that, in the embodiments of the invention, the setting value of the master identification key and the setting value of the slave identification key may be stored in the respective memory device by using different encoding methods, read/write sequences of bytes or storage address rules, so as to increase the difficulty of cracking the identification key. The following paragraphs will give a more detailed introduction.

Step S214: the signal processing device is controlled to operate in a normal mode. In the normal mode, the signal processing device outputs at least one of a power signal, a control signal, an image signal and an audio signal to the signal transmitting device 200, and/or processes at least one of the power signal, the control signal, the image signal and the audio signal received from the signal transmitting device 200. That is, under the normal mode, the signal processing device performs the original operations of communication protocol conversion and signal conversion that are supposed to be performed.

Step S216: the signal processing device is controlled to operate in a limited mode. In the limited mode, the signal processing device does not output any signal to the signal transmitting device or ignores any signal received from the signal transmitting device, or the signal processing device only outputs a limited signal to the signal transmitting device.

According to an embodiment of the invention, in step S206, the determination of the setting values of the master identification key or the slave identification key being equal to an initial value may comprise the following different scenarios:

In the scenario where both the setting value of the master identification key and the setting value of the slave identification key are equal to the initial value, it means that both the signal processing device and the signal transmitting device 200 are used for the first time. Since the setting values of the master identification key and the slave identification key are currently set to the initial value which is a specific value or has a specific pattern, it means that both the signal processing device and the signal transmitting device 200 are allowed to be used in the signal processing system. Therefore, the processor may continue to perform step S210 and subsequent steps.

In the scenario where the setting value of the master identification key is equal to the initial value but the setting value of the slave identification key is equal to another value different from the initial value, it means that the signal transmitting device 200 has already been activated and the signal processing device or the host device 100 or the display device 300 comprising this signal processing device has been replaced with a new product, for example, being replaced with a new product for the reason of product maintenance. At this time, the processor may continue to perform step S210 and subsequent steps, so as to update the setting value of the master identification key and the setting value of the slave identification key. After the setting values have been updated, the old device that was previously paired with the signal transmitting device 200 can no longer be successfully paired with the signal transmitting device 200 and can no longer function normally (referring to the flow shown in FIG. 2, the process goes to step S208 and step S216 for controlling the old device to operate in the limited mode).

In the scenario where the setting value of the master identification key is equal to a value different from the initial value and the setting value of the slave identification key is equal to the initial value, it means that the signal processing device or the host device 100 or the display device 300 comprising this signal processing device has already been activated and the signal transmitting device 200 has been replaced with a new product, for example, being replaced with a new product for the reason of malfunction. At this time, the processor may continue to perform step S210 and subsequent steps, so as to update the setting value of the master identification key and the setting value of the slave identification key. After the setting values have been updated, the old signal transmitting device that was previously paired with the signal processing device can no longer be successfully paired with the signal processing device and can no longer function normally (referring to the flow shown in FIG. 2, the process goes to step S208 and step S216 for controlling the signal processing device to operate in limited mode).

In addition, according to an embodiment of the invention, the performance of step S214 also means that the signal processing system allows the panel device to be lit up. For example, in one embodiment of the invention, after the signal transmitting device is correctly installed in the system and the processor of the signal processing device determines that the signal transmitting device is a device allowed to be used (i.e., authorized) in this system during the aforementioned device identifying and pairing process, the panel device 321 can be lit up. Because execution of the aforementioned device identifying and pairing process is very quick, after determining that the signal transmitting device is an authorized device, the panel device 321 can be lit immediately, so the user experience is not affected.

In the embodiments of the invention, the setting value of the master identification key and the setting value of the slave identification key may be stored in the respective memory device by using different encoding methods, so as to increase the difficulty of cracking the identification key. For example, the setting value of the master identification key stored in the corresponding memory device may be encoded by using the binary code, while setting value of the slave identification key stored in the corresponding memory device may be encoded by using the gray code. In other words, in the embodiments of the invention, the setting values (the actual setting values) of the master identification key and the slave identification key are substantially identical, but the content (the disguised setting values) stored in the corresponding memory devices may be different. Since the encoding methods are known to the processor of the signal processing device, the processor may perform the corresponding decoding operation after reading the setting values (the disguised setting values) of the master identification key and the slave identification key, so as to correctly obtain the actual setting values of the master identification key and the slave identification key.

In addition, the number of bits utilized to record the master identification key and the slave identification key may be higher than a threshold, so as to provide better protection. For example, the number of bits utilized to record the master identification key and the slave identification key may be more than 16 bits.

In addition, when storing or updating the master identification key and the slave identification key, the processor may also use different read/write orders or sequences of bytes of a word (that is, the Endianness) to write the corresponding setting value of the master identification key and the slave identification key into the corresponding memory device. For example, the processor may use the style of big-endian (BE) to write the setting value of the master identification key into the corresponding memory device and use the style of little-endian (LE) to write the setting value of the slave identification key into the corresponding memory device. Under such operations, the same result of the setting values (the actual setting values) of the master identification key and the slave identification key being substantially identical but the content (the disguised setting values) stored in the corresponding memory devices being different can also be achieved. Since the style of Endianness is known to the processor of the signal processing device, the processor may read the setting values (the disguised setting values) of the master identification key and the slave identification key by the corresponding Endianness, so as to correctly obtain the actual setting values of the master identification key and the slave identification key.

In addition, the processor may also use different storage address rules, such as, storing the bits corresponding to the master identification key and the slave identification key in a discontinuous manner when storing or updating the master identification key and the slave identification key. As an example, the processor does not store all the bits of the master identification key and the slave identification key in consecutive addresses, but divides the bits of the master identification key and the slave identification key into multiple parts and selects some discontinuous addresses for storing the bits of each part according to specific rules. Under such operations, the same result of the setting values (the actual setting values) of the master identification key and the slave identification key being substantially the same but the content (the disguised setting values) stored in the corresponding memory devices being different can also be achieved. Since the rules of selecting the memory addresses are known to the processor of the signal processing device, the processor may read the setting values (the disguised setting values) of the master identification key and the slave identification key in compliance with the corresponding rules, so as to correctly obtain the bits of each part of the master identification key and the slave identification key and restore the bits to the actual setting values by using the obtained bits.

It is to be understood that the foregoing embodiments are only provided for illustration. The method to implement the concept of making the same setting values (the actual setting values) of the master identification key and the slave identification key to be stored as or represented by different content (the disguised setting values) in the corresponding memory devices are not limited to those as illustrated in the foregoing embodiments.

In the embodiments as illustrated above, via the proposed method for identifying and pairing a signal transmitting device or the signal processing system implementing the proposed method, the signal transmitting device may be effectively identified and paired, to prevent the electronic devices and cables/transmission lines from being maliciously copied by unauthorized vendors in the market, while maintaining the convenience in manufacturing, maintaining and inventory managing of the products.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A signal processing system, comprising:
   a signal processing device, comprising;
      a processor; and
      a memory device, configured to store a master identification key; and
   a signal transmitting device, coupled to the signal processing device and comprising a memory device configured to store a slave identification key,
   wherein in a device identifying and pairing process, the processor reads the memory device of the signal processing device to obtain a setting value of the master identification key and reads the memory device of the signal transmitting device to obtain a setting value of the slave identification key, and the processor determines whether the setting value of the master identification key and the setting value of the slave identification key are equal to an initial value or whether the setting value of the master identification key is identical to the setting value of the slave identification key,
   when the processor determines that the setting value of the master identification key is not identical to the setting value of the slave identification key and both the setting value of the master identification key and the setting value of the slave identification key are not equal to the initial value, the processor controls the signal processing device to operate in a limited mode, wherein in the limited mode, the signal processing device does not output any signal to the signal transmitting device or ignores any signal received from the signal transmitting device, or the signal processing device only outputs a limited signal to the signal transmitting device.

2. The signal processing system as claimed in claim 1, wherein when both the setting value of the master identification key and the setting value of the slave identification key are equal to the initial value, the processor generates a predetermined value different from the initial value and sets the master identification key and the slave identification key according to the predetermined value for both the setting value of the master identification key and the setting value of the slave identification key being equal to the predetermined value.

3. The signal processing system as claimed in claim 2, wherein after setting the master identification key and the slave identification key according to the predetermined value, the processor further controls the signal processing device to operate in a normal mode, and wherein in the normal mode, the signal processing device outputs at least one of a power signal, a control signal, an image signal and an audio signal to the signal transmitting device, or processes at least one of the power signal, the control signal, the image signal and the audio signal received from the signal transmitting device.

4. The signal processing system as claimed in claim 1, wherein when the signal processing device determines that at least one of the setting value of the master identification key and the setting value of the slave identification key is equal the initial value, the processor generates a predetermined value different from the initial value and sets the master identification key and the slave identification key according to the predetermined value for both the setting value of the master identification key and the setting value of the slave identification key being equal to the predetermined value.

5. The signal processing system as claimed in claim 4, wherein after setting the master identification key and the slave identification key according to the predetermined value, the processor further controls the signal processing device to operate in a normal mode, and wherein in the normal mode, the signal processing device outputs at least one of a power signal, a control signal, an image signal and an audio signal to the signal transmitting device, or processes at least one of the power signal, the control signal, the image signal and the audio signal received from the signal transmitting device.

6. The signal processing system as claimed in claim 1, wherein when the processor determines that both the setting value of the master identification key and the setting value of the slave identification key are equal to a value different from the initial value, the processor controls the signal processing device to operate in a normal mode, wherein in the normal mode, the signal processing device outputs at least one of a power signal, a control signal, an image signal and an audio signal to the signal transmitting device, or processes at least one of the power signal, the control signal, the image signal and the audio signal received from the signal transmitting device.

7. The signal processing system as claimed in claim 1, wherein the setting value of the master identification key and the setting value of the slave identification key are stored in the respective memory device by using different encoding methods, read/write sequences of bytes or storage address rules.

8. The signal processing system as claimed in claim 1, wherein the signal processing device is a bridge device configured in a host device or a display device to perform signal conversion on one or more signals received from or provided to the signal transmitting device, and the signal transmitting device is a cable.

9. A method for identifying and pairing a signal transmitting device, comprising:
reading a memory device of a signal processing device in a signal processing system to obtain a setting value of a master identification key;
reading a memory device of the signal transmitting device in the signal processing system to obtain a setting value of a slave identification key;
determining whether at least one of the setting values of the master identification key and the slave identification key is equal to an initial value;
determining whether the setting value of the master identification key is identical to the setting value of the slave identification key when none of the setting values equals to the initial value; and
controlling the signal processing device to operate in a limited mode when the setting value of the master identification key is not identical to the setting value of the slave identification key,
wherein in the limited mode, the signal processing device does not output any signal to the signal transmitting device or ignores any signal received from the signal transmitting device, or the signal processing device only outputs a limited signal to the signal transmitting device.

10. The method as claimed in claim 9, further comprising:
generating a predetermined value different from the initial value when determining that at least one of the setting values of the master identification key and the slave identification key is equal the initial value; and
setting the master identification key and the slave identification key according to the predetermined value for both the setting value of the master identification key and the setting value of the slave identification key being equal to the predetermined value.

11. The method as claimed in claim 10, further comprising:
controlling the signal processing device to operate in a normal mode after setting the master identification key and the slave identification key according to the predetermined value,
wherein in the normal mode, the signal processing device outputs at least one of a power signal, a control signal, an image signal and an audio signal to the signal transmitting device, or processes at least one of the power signal, the control signal, the image signal and the audio signal received from the signal transmitting device.

12. The method as claimed in claim 9, further comprising:
controlling the signal processing device to operate in a normal mode when determining that both the setting value of the master identification key and the setting value of the slave identification key are equal to a value different from the initial value,
wherein in the normal mode, the signal processing device outputs at least one of a power signal, a control signal, an image signal and an audio signal to the signal transmitting device, or processes at least one of the power signal, the control signal, the image signal and the audio signal received from the signal transmitting device.

13. The method as claimed in claim 9, wherein the setting value of the master identification key and the setting value of the slave identification key are stored in the respective memory device by using different encoding methods, read/write sequences of bytes or storage address rules.

14. The method as claimed in claim 9, wherein the signal processing device is a bridge device configured in a host device or a display device to perform signal conversion on one or more signals received from or provided to the signal transmitting device, and the signal transmitting device is a cable.

\* \* \* \* \*